US011905915B2

(12) United States Patent
Iwamoto

(10) Patent No.: US 11,905,915 B2
(45) Date of Patent: Feb. 20, 2024

(54) CANISTER

(71) Applicant: FUTABA INDUSTRIAL CO., LTD., Okazaki (JP)

(72) Inventor: Koji Iwamoto, Okazaki (JP)

(73) Assignee: Futaba Industrial Co., Ltd., Okazaki (JP)

( * ) Notice: Subject to any disclaimer, the term of this patent is extended or adjusted under 35 U.S.C. 154(b) by 0 days.

(21) Appl. No.: 17/977,436

(22) Filed: Oct. 31, 2022

(65) Prior Publication Data

US 2023/0151781 A1 May 18, 2023

(30) Foreign Application Priority Data

Nov. 15, 2021 (JP) ................................ 2021-185793

(51) Int. Cl.
*F02M 25/08* (2006.01)

(52) U.S. Cl.
CPC .... *F02M 25/0854* (2013.01); *F02M 25/0872* (2013.01)

(58) Field of Classification Search
CPC ........... F02M 25/0854; F02M 25/0872; B01D 53/0446
See application file for complete search history.

(56) References Cited

U.S. PATENT DOCUMENTS 4,750,923 A * 6/1988 Haruta ............... B01D 53/0415 55/319
2017/0167447 A1* 6/2017 Omichi .................... H05B 3/18
2018/0163671 A1* 6/2018 Iwamoto ............ B01D 53/0446
2019/0186426 A1 6/2019 Nakagawa et al.
2020/0124004 A1 4/2020 Ajiki et al.
2021/0199071 A1* 7/2021 Ajiki .................. B01D 53/0446
2021/0285407 A1* 9/2021 Murata .............. F02M 25/0854
2022/0333558 A1* 10/2022 Iwamoto ............ B01D 53/0415
2022/0333559 A1* 10/2022 Iwamoto ............ F02M 25/0872
(Continued)

FOREIGN PATENT DOCUMENTS

JP H05202818 A 8/1993
JP 2009156030 A 7/2009
JP 2009191688 A 8/2009
(Continued)

OTHER PUBLICATIONS

Notice of Reasons for Refusal for Japanese Patent Application No. 2021185792, dated Sep. 26, 2023, 8 pages.
(Continued)

*Primary Examiner* — Sizo B Vilakazi
(74) *Attorney, Agent, or Firm* — Withrow + Terranova, PLLC; Vincent K. Gustafson

(57) ABSTRACT

Provided is a canister including at least one chamber and a resin member. The resin member is arranged in an object chamber, which is any of the at least one chamber. An adsorbent arranged in the object chamber is formed as a plurality of granular bodies. The resin member is an integrally formed member of resin, and includes a coupling member and at least one rod-shaped unit. The at least one rod-shaped unit includes a plurality of rod-shaped portions extending from the coupling member in a direction substantially parallel to a direction intersecting a gas flow direction in the object chamber at an angle of 45° or more and 90° or less.

15 Claims, 6 Drawing Sheets

(56) References Cited

U.S. PATENT DOCUMENTS

2023/0151783 A1* 5/2023 Iwamoto .............. F02M 25/089
96/108

FOREIGN PATENT DOCUMENTS

| | | | |
|---|---|---|---|
| JP | 2018096254 | A | 6/2018 |
| JP | 2019108880 | B2 | 7/2019 |
| JP | 2020067014 | A | 4/2020 |
| JP | 2020112164 | A | 7/2020 |
| JP | 2021107704 | A | 7/2021 |

OTHER PUBLICATIONS

Notice of Reasons for Refusal for Japanese Patent Application No. 2021185793, dated Oct. 17, 2023, 8 pages.

* cited by examiner

CANISTER

CROSS-REFERENCE TO RELATED APPLICATIONS

This application claims the benefit of Japanese Patent Application No. 2021-185793 filed on Nov. 15, 2021 with the Japan Patent Office, the entire disclosure of which is incorporated herein by reference.

BACKGROUND

The present disclosure relates to a canister for adsorbing fuel vapor generated in a fuel tank.

A canister disclosed in Japanese Unexamined Patent Application Publication No. 2018-96254 is provided with an object chamber in which an adjusting member is arranged that comprises a plurality of rod-shaped portions and a coupling member to couple together bases of the rod-shaped portions. The rod-shaped portions extend substantially parallel to a gas flow direction, and are arranged with spacing therebetween, throughout the object chamber. This leads to generation of gaps between activated carbon pellets, as a granular adsorbent, arranged in the object chamber and the respective rod-shaped portions, resulting in reducing the ventilation resistance of the object chamber.

Here, it is conceivable that the adjusting member is manufactured from resin by injection molding. To carry out the injection molding, it is necessary to form a draft on an outer peripheral surface of each rod-shaped portion so that the adjusting member can be taken out of a die. The draft is formed by inclining the outer peripheral surface of each rod-shaped portion so that it becomes thinner with increasing distance from the coupling member.

SUMMARY

However, in a case where the rod-shaped portions are long, the base of each rod-shaped portion needs to be made thicker in forming the draft. This makes it likely that accumulation of heat occurs around the base of the rod-shaped portion when carrying out the injection molding.

In general, a die for injection molding has a cooling pipe arranged therein that allows a refrigerant for cooling a molded member to flow. In the die for the adjusting member, however, although a cooling pipe can be arranged around the adjusting member, it is difficult to arrange a cooling pipe so as to pass through between the rod-shaped portions because the space between the rod-shaped portions of the adjusting member is small.

Thus, a part around the base of each rod-shaped portion made thicker due to the draft is less likely to be cooled than other parts. This results in occurrence of non-uniform temperature around the base of the rod-shaped portion, thus generating a slant (hereinafter also referred to as a warpage) in the rod-shaped portion. Accordingly, in the case where the rod-shaped portions are long, manufacture of the adjusting member has been difficult.

In one aspect of the present disclosure, it is desirable to facilitate manufacture of a canister.

One aspect of the present disclosure is a canister configured to be mounted in a vehicle with an engine. The canister comprises at least one chamber, an inflow port, an atmosphere port, an outflow port, and a resin member. In the at least one chamber, an adsorbent to adsorb fuel vapor is arranged. The inflow port is configured to allow the fuel vapor to flow into the at least one chamber from a fuel tank of the vehicle. The atmosphere port is configured to allow atmospheric air to flow into the at least one chamber from outside of the vehicle. The outflow port is configured to allow the fuel vapor adsorbed on the adsorbent to flow out toward the engine by means of the atmospheric air flowing in from the atmosphere port. The resin member is arranged in an object chamber, which is any of the at least one chamber. The adsorbent arranged in the object chamber is formed as a plurality of granular bodies. The resin member is an integrally formed member of resin, and comprises a coupling member and at least one rod-shaped unit. The at least one rod-shaped unit comprises a plurality of rod-shaped portions extending from the coupling member in an extending direction substantially parallel to a direction intersecting a gas flow direction in the object chamber at an angle of 45° or more and 90° or less.

This configuration can facilitate shortening of the length of the rod-shaped portions while arranging the rod-shaped portions throughout the object chamber, thus inhibiting the base of each rod-shaped portion from being thicker due to formation of the draft. Accordingly, occurrence of a warpage in the rod-shaped portion can be inhibited when carrying out injection molding for the resin member, resulting in facilitating manufacture of the canister.

In one aspect of the present disclosure, the object chamber may have an elongated shape extending in the gas flow direction in the object chamber.

This configuration can further facilitate shortening of the length of the rod-shaped portions, thus inhibiting the base of each rod-shaped portion from being thicker due to formation of the draft. Accordingly, occurrence of a warpage in the rod-shaped portion can be further inhibited when carrying out injection molding for the resin member.

In one aspect of the present disclosure, at least a part of the plurality of rod-shaped portions may have, on an outer peripheral surface thereof, at least one recess formed.

In this configuration, gaps are formed between the at least one recess formed on the rod-shaped portion and the adsorbent as the plurality of granular bodies. This enables reduction of the ventilation resistance of the canister.

In one aspect of the present disclosure, the resin member may comprise, as the at least one rod-shaped unit, a first rod-shaped unit and a second rod-shaped unit. The coupling member may comprise a first portion and a second portion. The second portion is positioned on a side opposite to the first portion. The plurality of rod-shaped portions in the first rod-shaped unit may extend, from the first portion, substantially parallel to a direction determined according to the first rod-shaped unit. The plurality of rod-shaped portions in the second rod-shaped unit may extend, from the second portion, substantially parallel to a direction determined according to the second rod-shaped unit.

This configuration makes it possible, when carrying out injection molding, to form the first and second rod-shaped units by means of different dies positioned on each side of the coupling member. Also, the rod-shaped portions in each of the first and second rod-shaped units extend in different extending directions from the coupling member positioned between these rod-shaped units. This can further facilitate shortening of the length of the rod-shaped portions in each rod-shaped unit while arranging the rod-shaped portions throughout the object chamber. Accordingly, occurrence of a warpage in the rod-shaped portion can be further inhibited when carrying out injection molding for the resin member.

In one aspect of the present disclosure, the first rod-shaped unit and the second rod-shaped unit may have a substantially identical shape.

This configuration simplifies the configuration of the resin member, thus facilitating manufacture of the resin member.

In one aspect of the present disclosure, the resin member may have a substantially plane-symmetrical shape with respect to a plane passing through the coupling member.

This configuration simplifies the configuration of the resin member, thus facilitating manufacture of the resin member.

In one aspect of the present disclosure, the extending direction of the plurality of rod-shaped portions may be a direction intersecting the gas flow direction in the object chamber at an angle of approximately 90°.

This configuration can further facilitate shortening of the length of the rod-shaped portions, thus inhibiting the base of each rod-shaped portion from being thicker due to formation of the draft. Accordingly, occurrence of a warpage in the rod-shaped portion can be further inhibited when carrying out injection molding for the resin member.

In one aspect of the present disclosure, both ends of the resin member in the gas flow direction may be positioned near an inner wall of the object chamber.

This configuration enables reduction of the ventilation resistance of the canister as the resin member is arranged from a first end through a second end of the object chamber in the gas flow direction.

In one aspect of the present disclosure, the coupling member may extend in the gas flow direction.

This configuration makes it possible to arrange the rod-shaped portions in the object chamber in a preferred manner.

BRIEF DESCRIPTION OF THE DRAWINGS

Example embodiments of the present disclosure will be described below with reference to the accompanying drawings, in which.

DETAILED DESCRIPTION OF EXEMPLARY EMBODIMENTS

Figure 1:
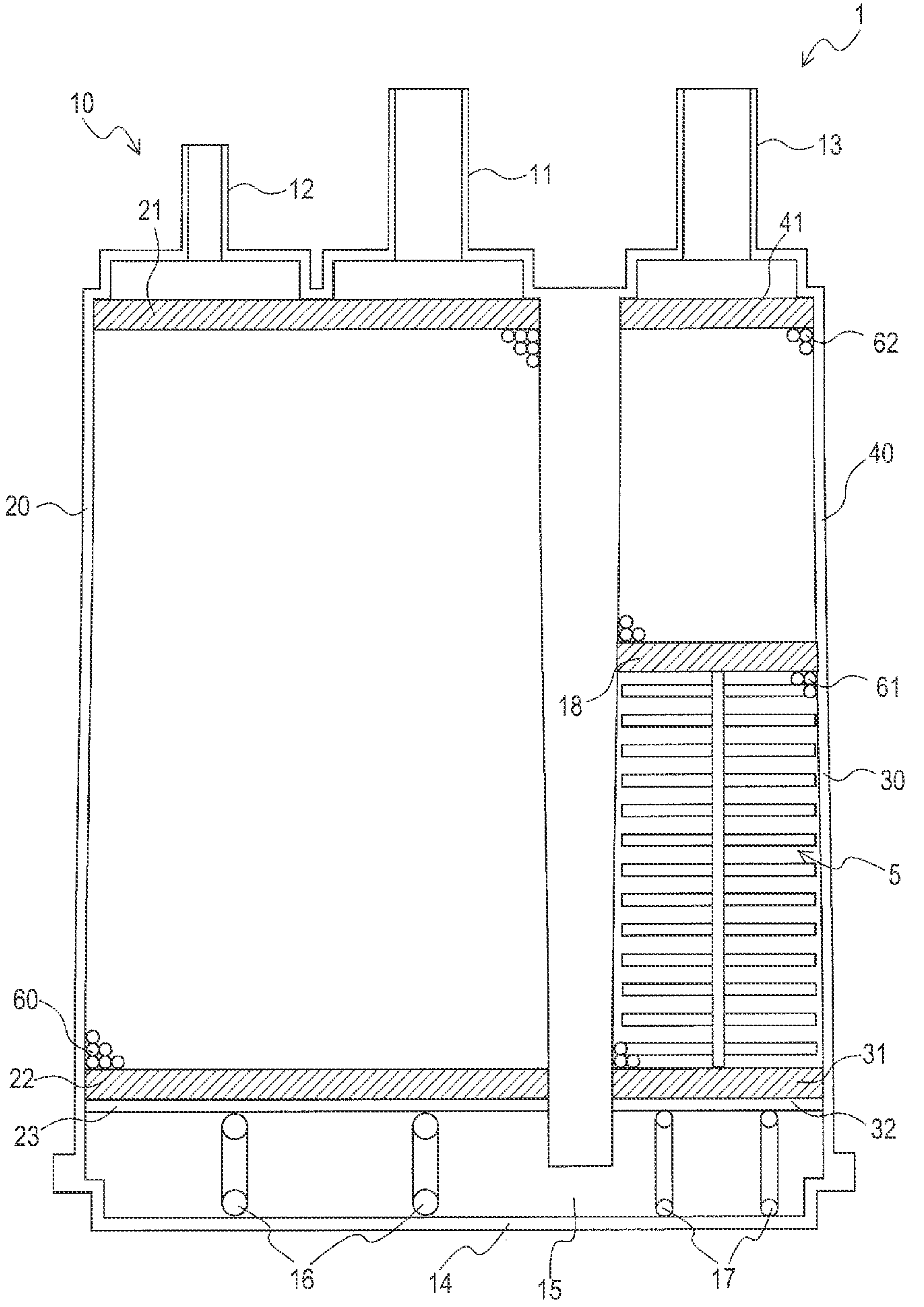
FIG. 1 is a sectional view of a canister as viewed from its side.

Embodiments of the present disclosure are not limited to the embodiments below, and may take various forms as long as they belong to the technical scope of the present disclosure.

1. Configuration of Canister

A canister 1 of a first embodiment (see FIG. 1) is mounted in a vehicle. The vehicle in which the canister 1 is mounted will be hereinafter referred to as the vehicle concerned. The canister 1 comprises a container 10 of synthetic resin. The container 10 comprises a first chamber 20, a second chamber 30, and a third chamber 40. Arranged respectively in the first chamber 20, the second chamber 30, and the third chamber 40 are adsorbents 60, 61, and 62 for adsorbing fuel vapor. The number of chambers in the canister 1 may be, for example, two or less, or four or more.

The adsorbent 61 in the second chamber 30 is formed as pellets, which are granular activated carbon. The adsorbent 61 in the second chamber 30 may be formed as a granular adsorbent other than the pellets. The absorbent 60 in the first chamber 20 and the absorbent 62 in the third chamber 40 may be formed as, for example, powdered activated carbon, or may be formed as pellets. The adsorbent 62 in the third chamber 40 may be formed as a honeycomb carbon block, as an example. The honeycomb carbon block comprises a side wall having a cylindrical shape, and is arranged in the third chamber 40 so as to extend in a gas flow direction. Provided inside the side wall are a plurality of flow paths passing through the honeycomb carbon block in its extending direction. The adsorbents 60, 61, and 62 respectively arranged in the first chamber 20, the second chamber 30, and the third chamber 40 may be formed of a material other than the activated carbon.

Provided at an end of the container 10 are an inflow port 11, an outflow port 12, and an atmosphere port 13. The inflow port 11 and the outflow port 12 allow for communication between the inside of the first chamber 20 and the outside of the container 10. The atmosphere port 13 allows for communication between the inside of the third chamber 40 and the outside of the container 10.

Hereinafter, a side of the container 10 of the canister 1 where the inflow port 11, the outflow port 12, and the atmosphere port 13 are arranged is referred to as a port side. The container 10 includes an opening on a side opposite to the port side. The opening is closed by a lid member 14. Hereinafter, the side opposite to the port side (i.e., a side where the lid member 14 is arranged) is referred to as a lid side.

The inflow port 11 is connected to a fuel tank for an engine of the vehicle concerned. The fuel vapor generated in the fuel tank flows into the canister 1 via the inflow port 11, and is adsorbed on the adsorbents 60, 61, and 62 in the respective chambers. In this way, the fuel is accumulated inside the canister 1.

The outflow port 12 is connected to an intake pipe of the engine of the vehicle concerned, and the atmosphere port 13 communicates with the outside of the vehicle concerned. The negative intake air pressure of the engine causes atmospheric air (i.e., purge air) to flow into the canister 1 via the atmosphere port 13. Such inflow of the purge air causes the fuel adsorbed on the adsorbents 60, 61, and 62 to be desorbed, and the desorbed fuel flows out together with the purge air from the outflow port 12 toward the intake pipe. In this way, a purging to remove the fuel adsorbed on the adsorbents 60, 61, and 62 is carried out, and the adsorbents 60, 61, and 62 are recovered.

In other words, the fuel vapor flowing in from the inflow port 11, the fuel vapor flowing out from the outflow port 12 during the purging, and the purge air flowing in from the atmosphere port 13 during the purging, flow in the chambers 20, 30, and 40 along a direction in which an end on the port side and an end on the lid side face each other.

As an example, the first chamber 20 has a substantially rectangular parallelepiped shape. The first chamber 20 has an elongated shape extending from the lid side to the port side, and its port side end is connected to the inflow port 11 and to the outflow port 12. There are provided filters 21 and

22, respectively, on the port side end and a lid side end of the first chamber 20, and the adsorbent 60 is arranged between the filters 21 and 22.

The first chamber 20 communicates, on its lid side end, with a communicating passage 15. The communicating passage 15 is arranged along the lid member 14, thus interconnecting the first chamber 20 and the second chamber 30. There is provided a porous plate 23 with permeability between the filter 22 on the lid side of the first chamber 20 and the communicating passage 15, and a coil spring 16 is provided between the porous plate 23 and the lid member 14. The coil spring 16 presses the porous plate 23 toward the port side. This allows fluid to flow to and fro between the first chamber 20 and the second chamber 30 via the communicating passage 15, in the inside of the canister 1.

The second chamber 30 and the third chamber 40 are adjacent to the first chamber 20, and each have an elongated shape extending from the lid side to the port side. As an example, L/D of the second chamber 30 and/or the third chamber 40 may be greater than 1. L means the length of the chamber in a gas flow direction, and D means an equivalent diameter of a cross section of the chamber perpendicular to the gas flow direction. The second chamber 30 and the third chamber 40 are arranged from the lid side to the port side, with their ends adjacent to each other. The second chamber 30 and the third chamber 40 are separated by a partition member 18 with permeability having a plate shape. This allows fluid to pass through the partition member 18 and flow to and fro between the inner space of the second chamber 30 and the inner space of the third chamber 40.

There is provided a filter 31 on a lid side end of the second chamber 30, and the adsorbent 61 is arranged between the filter 31 and the partition member 18. Further, there is provided a filter 41 on a port side end of the third chamber 40, and the adsorbent 62 is arranged between the filter 41 and the partition member 18.

There is provided a porous plate 32 with permeability between the filter 31 on the lid side of the second chamber 30 and the communicating passage 15, and a coil spring 17 is provided between the porous plate 32 and the lid member 14. The coil spring 17 presses the porous plate 32 toward the port side. The port side end of the third chamber 40 is connected to the atmosphere port 13.

2. Resin Member

In the present embodiment, as an example, the second chamber 30 is configured as an object chamber, and a resin member 5 is provided in the second chamber 30 (see FIG. 1). The first chamber 20 or the third chamber 40 may be configured as the object chamber in which the resin member 5 is arranged, or two or more of the first chamber 20, the second chamber 30, and the third chamber 40 may be configured as the object chambers. In the object chamber, a granular adsorbent, such as pellets, is arranged.

Figure 2:
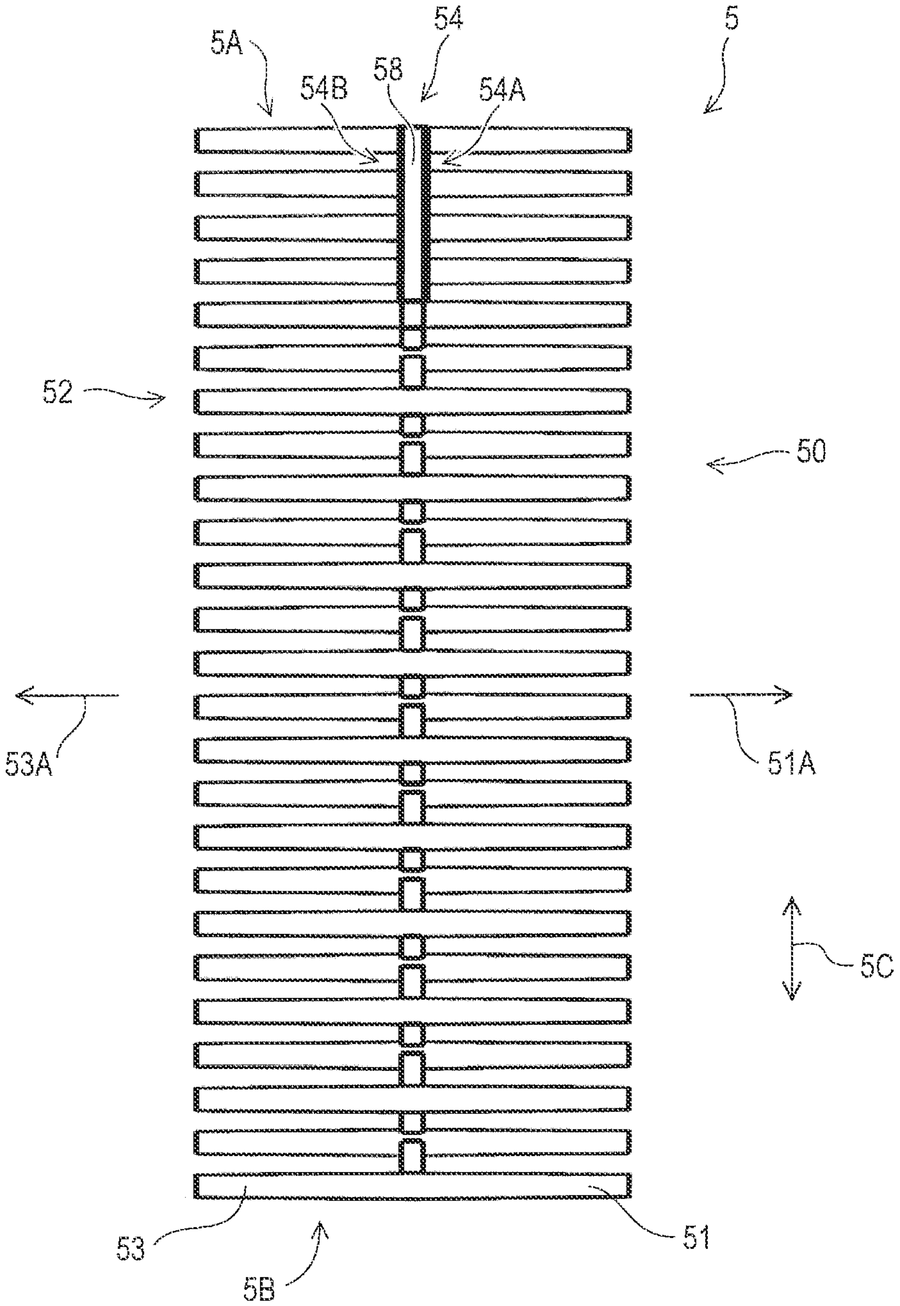
FIG. 2 is a front view of a resin member.
Figure 3:
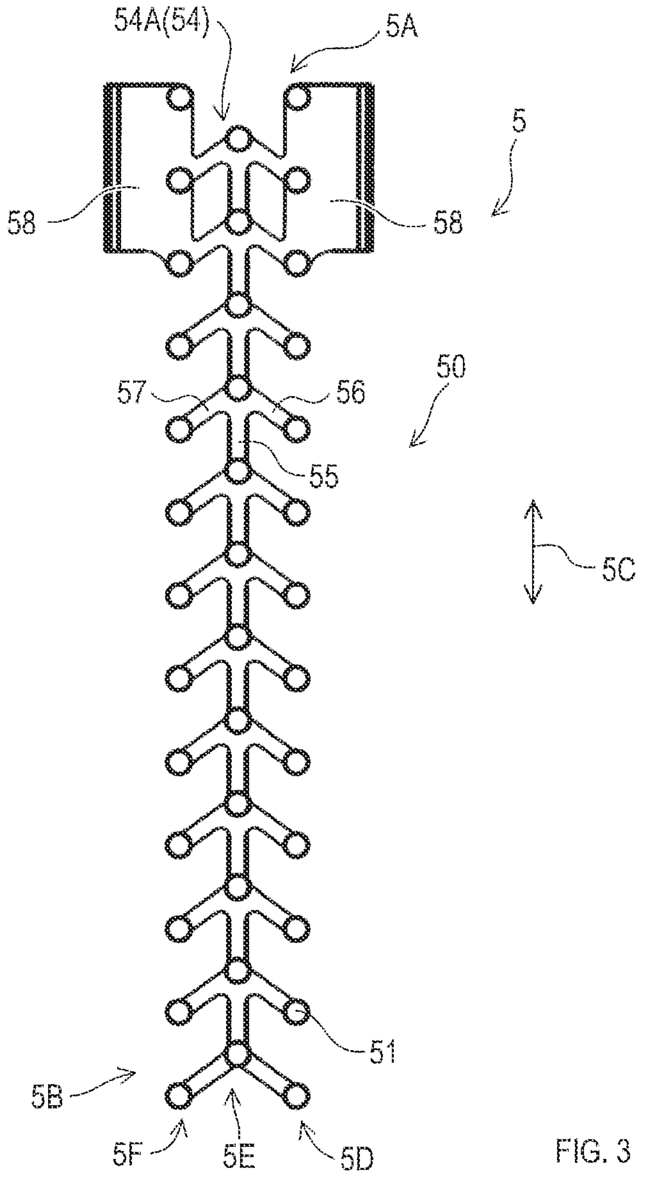
FIG. 3 is a side view of the resin member.
Figure 4:
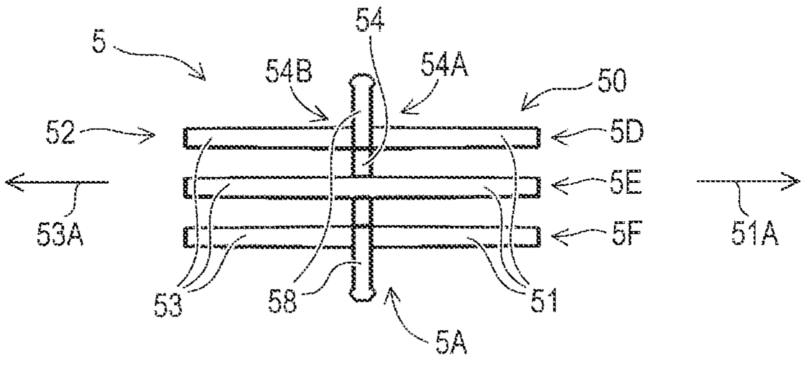
FIG. 4 is a bottom view of the resin member as viewed from a first end side.

The resin member 5 is arranged in the second chamber 30 such that a first end 5A is positioned on the port side and a second end 5B is positioned on the lid side (see FIGS. 2 through 4). The first end 5A of the resin member 5 is positioned close to an inner wall of the object chamber located at a port side end thereof, and the second end 5B is positioned close to an inner wall of the object chamber located at a lid side end thereof. On the contrary, however, the resin member 5 may be arranged in the second chamber 30 such that the second end 5B is positioned on the port side and the first end 5A is positioned on the lid side.

The resin member 5 is formed of a resin into one piece, and comprises first and second rod-shaped units 50 and 52, and a coupling member 54.

3. First and Second Rod-Shaped Units

The first rod-shaped unit 50 comprises a plurality of first rod-shaped portions 51 (see FIGS. 2 through 4). The first rod-shaped portions 51 are elongated portions extending so as to be substantially parallel to each other with spaces therebetween and having the lengths substantially identical to each other. Each first rod-shaped portion 51 extends in a first extending direction 51A from a first portion 54A of the coupling member 54. Each first rod-shaped portion 51 has a draft formed thereon, and becomes thinner with increasing distance toward its tip. Each first rod-shaped portion 51 is formed such that, as an example, its cross section perpendicular to its extending direction (hereinafter simply referred to as the cross section) is substantially circular. However, the shape of the cross section may be determined as appropriate.

The second rod-shaped unit 52 also comprises a plurality of second rod-shaped portions 53 configured similarly to the plurality of first rod-shaped portions 51. The second rod-shaped portions 53 have the lengths substantially identical to those of the first rod-shaped portions 51. Each second rod-shaped portion 53 extends in a second extending direction 53A from a second portion 54B of the coupling member 54 opposite to the first portion 54A.

As an example, the first and second extending directions 51A and 53A intersect gas flow directions 5C in the second chamber 30 at an angle of approximately 90°, and the first extending direction 51A is opposite to the second extending direction 53A. A base of each first rod-shaped portion 51 is adjacent to a base of a corresponding second rod-shaped portion 53, and the first rod-shaped portion 51 and the corresponding second rod-shaped portion 53 whose base is adjacent to that of the first rod-shaped portion 51 extend substantially in a straight line with the coupling member 54 therebetween.

In other words, the first rod-shaped unit 50 and the second rod-shaped unit 52 have a substantially identical shape, and the resin member 5 has a substantially plane-symmetrical shape with a plane passing through the coupling member 54 as its center.

The first and second rod-shaped portions 51 and 53 are arranged, as an example, so as to form a first row 5D, a second row 5E, and a third row 5F, and are arranged throughout the second chamber 30. The number of the rows of the first and second rod-shaped portions 51 and 53, and the number of the first and second rod-shaped portions 51 and 53 arranged in each row may be determined as appropriate according to the size of the chamber in which the resin member 5 is arranged.

The adsorbent 61 arranged in the second chamber 30 is formed as granular pellets. Thus, by arranging the first and second rod-shaped portions 51 and 53 (hereinafter also referred to simply as the rod-shaped portions) in the second chamber 30, gaps are formed between the respective rod-shaped portions and the adsorbent 61. This results in reducing the ventilation resistance of the second chamber 30.

4. Coupling Member

The coupling member 54 is arranged from the first end 5A through the second end 5B of the resin member 5, and extends along the gas flow directions 5C in the second chamber 30 (see FIGS. 2 through 4). The coupling member

54 is positioned substantially in the middle of the resin member 5 with respect to the first and second extending directions 51A and 53A, and couples the bases of the first rod-shaped portions 51 and the bases of the second rod-shaped portions 53 to each other. It is to be appreciated that, in the resin member 5 of the present embodiment, the rod-shaped portions 51 and 53 are coupled to each other by the coupling member 54, as an example, and are not coupled to each other by other elements. The coupling member 54 comprises a body portion 55, a plurality of first branch portions 56, a plurality of second branch portions 57, and two flat portions 58 (see FIGS. 3 and 4).

The body portion 55 is a rod-shaped portion extending substantially linearly along the gas flow directions 5C. The body portion 55 couples the bases of the first rod-shaped portions 51 and the bases of the corresponding second rod-shaped portions 53 in the second row 5E to each other.

The first branch portions 56 are each arranged so as to protrude toward the first row 5D from the base of the corresponding rod-shaped portion in the second row 5E. Each first branch portion 56 couples the base of the corresponding rod-shaped portion in the second row 5E to the base of the rod-shaped portion in the first row 5D positioned on the side of the second end 5B with respect to such rod-shaped portion and closest to such rod-shaped portion.

The second branch portions 57 are each arranged so as to protrude toward the third row 5F from the base of the corresponding rod-shaped portion in the second row 5E. Each second branch portion 57 couples the base of the corresponding rod-shaped portion in the second row 5E to the base of the rod-shaped portion in the third row 5F positioned on the side of the second end 5B with respect to such rod-shaped portion and closest to such rod-shaped portion.

The flat portions 58 are each arranged in the first row 5D and in the third row 5F. The flat portion 58 in the first row 5D couples the bases of three rod-shaped portions arranged from the first end 5A in the first row 5D to each other. Also, the flat portion 58 in the third row 5F couples the bases of three rod-shaped portions arranged from the first end 5A in the third row 5F to each other.

Each flat portion 58 has a flat shape substantially parallel to the gas flow directions 5C and extending so as to be substantially orthogonal to the first and second extending directions 51A and 53A, and protrudes toward the inner wall of the second chamber 30 to abut the inner wall. This results in forming gaps between the inner wall of the second chamber 30 and the rod-shaped portions in the first row 5D and in the third row 5F.

5. Recess

Figure 5:
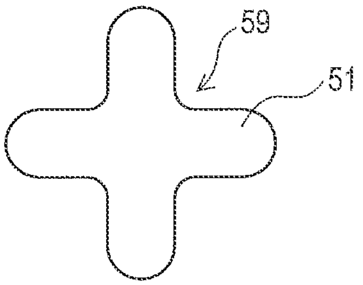
FIG. 5 is a sectional view of a first rod-shaped portion 51 having recesses formed thereon.
Figure 6:
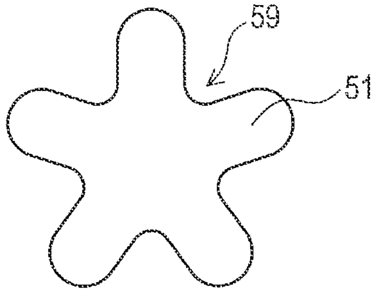
FIG. 6 is a sectional view of the first rod-shaped portion 51 having the recesses formed thereon.

At least a part of the rod-shaped portions in the first rod-shaped unit 50 and/or the second rod-shaped unit 52 may have a recess 59 formed on its outer peripheral surface (see FIGS. 5 and 6). Specifically, for example, the recess 59 may be formed as a groove-shaped portion extending substantially parallel to the extending direction of the rod-shaped portion from the base thereof or its vicinity to the tip thereof or its vicinity. As an example, the recess 59 may be provided four in number with substantially equal spacing, to thereby form the cross section of the rod-shaped portion in an X-like shape (see FIG. 5). Alternatively, for example, the recess 59 may be provided five in number with substantially equal spacing, to thereby form the cross section of the rod-shaped portion in a star-like shape (see FIG. 6).

Obviously, the recess 59 may be formed as a groove-shaped portion extending in a direction different from the extending direction, without being limited to the above. Further, the recess 59 is not limited to the groove-shaped portion and, for example, may be formed on a dot-shaped area on the outer peripheral surface of the rod-shaped portion.

The rod-shaped portions in the first rod-shaped unit 50 and/or the second rod-shaped unit 52 may comprise rod-shaped portions of two or more types differing in the shape of the cross section, or may comprise at least one particular rod-shaped portion. The at least one particular rod-shaped portion comprises two or more segments arranged along the extending direction of the at least one particular rod-shaped portion and differing in the shape of the cross section.

6. Manufacturing Method of Resin Member

Figure 7:
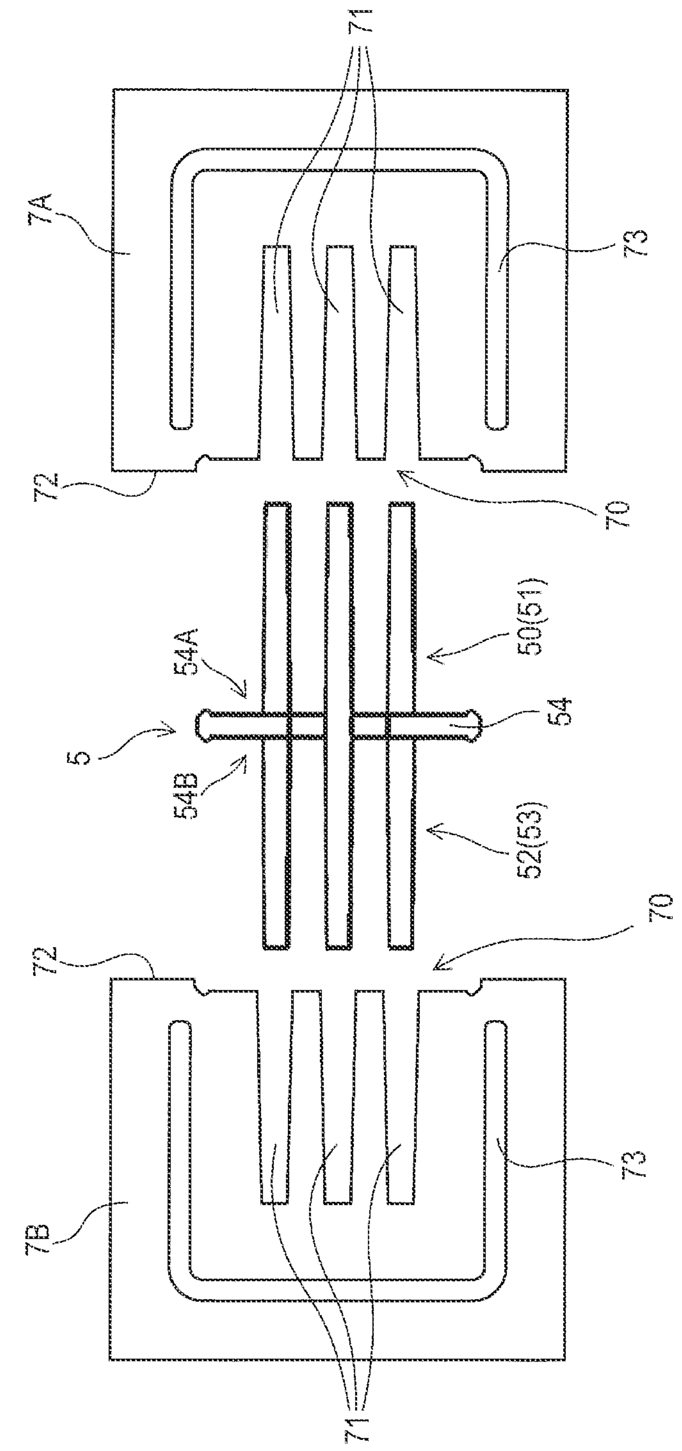
FIG. 7 is an explanatory diagram as to injection molding of the resin member.

The resin member 5 is manufactured by injection molding using first and second dies 7A and 7B (see FIG. 7). The first die 7A is configured to form the first rod-shaped unit 50 (i.e., the first rod-shaped portions 51) and the first portion 54A of the coupling member 54. The second die 7B is configured to form the second rod-shaped unit 52 (i.e., the second rod-shaped portions 53) and the second portion 54B of the coupling member 54.

The first die 7A comprises a recessed portion 70, a plurality of holes 71, a contact surface 72, and a cooling pipe 73.

The recessed portion 70 is a portion for forming the first portion 54A of the coupling member 54, and is arranged on the contact surface 72.

The holes 71 are cylindrically-shaped portions for forming the first rod-shaped portions 51, and are arranged at the bottom of the recessed portion 70. To form a draft on each first rod-shaped portion 51, the diameter of each hole 71 becomes smaller with increasing distance toward the bottom side of the hole 71.

The cooling pipe 73 is a portion for allowing a coolant for cooling a resin filling the recessed portion 70 and the holes 71 to flow when carrying out injection molding. The cooling pipe 73 is arranged so as to pass around the first rod-shaped portions 51. However, the cooling pipe 73 does not pass between the respective first rod-shaped portions 51.

The second die 7B has a configuration similar to that of the first die 7A, and comprises the recessed portion 70, the plurality of holes 71, the contact surface 72, and the cooling pipe 73.

When manufacturing the resin member 5, the first and second dies 7A and 7B are arranged such that the contact surfaces 72 are in contact with each other. At this time, the recessed portion 70 and the holes 71 in the first die 7A, and the recessed portion 70 and the holes 71 in the second die 7B are substantially plane-symmetrical with respect to the contact surfaces 72.

Next, a space formed by the recessed portions 70 and the holes 71 in the first and second dies 7A and 7B is filled with a high-temperature resin. Then, the resin filling the space is cooled by flowing the coolant through the cooling pipe 73, whereby the resin is cured.

Upon completion of the curing of the resin, the first die 7A and the second die 7B are separated from each other, and the resin member 5 is taken out from the inside of the first and second dies 7A and 7B.

A configuration may be employed in which the first die 7A is configured with a plurality of dies and the first rod-shaped unit 50 and the first portion 54A of the coupling member 54 are formed by the plurality of dies when carrying out injection molding. Similarly, the second die 7B may also be configured with a plurality of dies.

7. Modified Examples

In the present embodiment, an angle at which the first extending direction 51A of the first rod-shaped portions 51 intersects the gas flow directions 5C (hereinafter referred to as a first intersection angle) is approximately 90°. Similarly, an angle at which the second extending direction 53A of the second rod-shaped portions 53 intersects the gas flow directions 5C (hereinafter referred to as a second intersection angle) is also approximately 90° (see FIG. 2).

Figure 8:
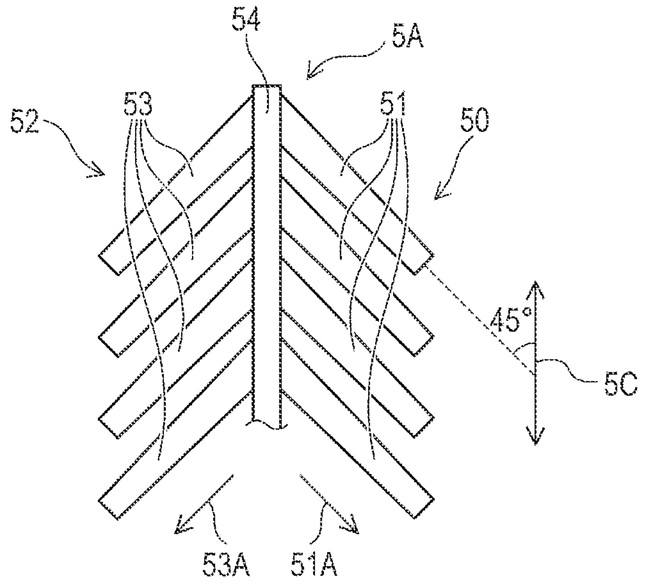
FIG. 8 is a front view of a resin member of a modified example.
Figure 9:
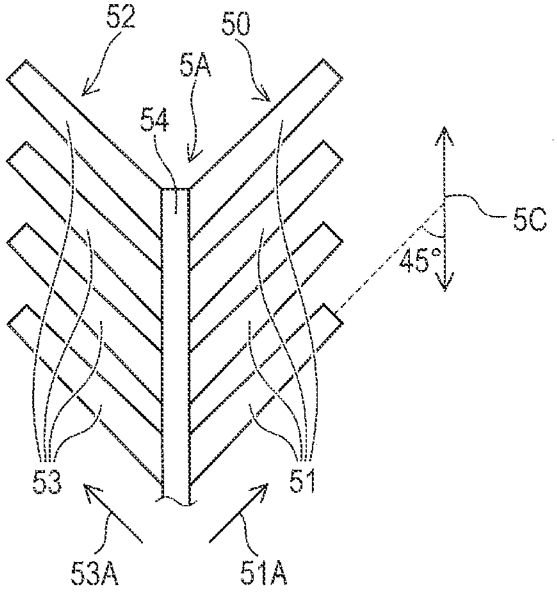
FIG. 9 is a front view of a resin member of a modified example.

However, the first and second intersection angles are not limited to approximately 90°, and may be determined in a range of 45° or more and 90° or less. Moreover, as shown in FIG. 8, the tips of the first and second rod-shaped portions 51 and 53 may be positioned on the side of the second end 5B with respect to the bases of such first and second rod-shaped portions 51 and 53, or may be positioned on the side of the first end 5A, as shown in FIG. 9. In either case, the first and second intersection angles are not limited to approximately 90°, and may be determined in the range of 45° or more and 90° or less. Furthermore, the first and second intersection angles may have values substantially identical to each other, or may have values different from each other.

When the first and second intersection angles have values different from approximately 90°, or even when the first and second intersection angles are different from each other, the resin member 5 is manufactured by injection molding, in a manner similar to the present embodiment.

8. Effects (1) The above-described embodiments can facilitate shortening of the length of the rod-shaped portions while arranging the rod-shaped portions throughout the second chamber 30. This makes it possible to inhibit the base of each rod-shaped portion from being thicker due to formation of the draft, to thereby inhibit accumulation of heat around the base of the rod-shaped portion when carrying out injection molding. Accordingly, occurrence of a warpage in the rod-shaped portion can be inhibited, resulting in facilitating manufacture of the canister 1.

Moreover, inhibiting occurrence of a warpage in the rod-shaped portion results in improvement of accuracy in dimensions of the resin member 5. Even when a warpage occurs in the rod-shaped portion, shortening of the length of the rod-shaped portion makes it possible to reduce dimensional deviation due to the warpage. Furthermore, shortening of the length of the rod-shaped portions makes it possible to reduce an injection stroke when manufacturing the resin member 5 by injection molding, thus enabling the injection molding to be carried out in shorter cycles. Additionally, an amount of the resin required to manufacture the resin member 5 can be reduced by inhibiting the bases of the rod-shaped portions from being thicker, thus enabling the canister 1 to be lighter in weight and lower in cost.

(2) The resin member 5 is arranged in the second chamber 30 having an elongated shape, and this can further facilitate shortening of the length of the rod-shaped portions. Accordingly, it is possible to inhibit the base of each rod-shaped portion from being thicker due to formation of the draft, to thereby further inhibit occurrence of a warpage in the rod-shaped portion when carrying out injection molding for the resin member 5.

(3) Forming the recess 59 on each rod-shaped portion results in forming gaps between the recess 59 and the pellets as the adsorbent. Accordingly, the ventilation resistance of the canister 1 can be reduced.

(4) When carrying out injection molding, the first and second rod-shaped units 50 and 52 can be formed by means of the first and second dies 7A and 7B, respectively, positioned on each side of the coupling member 54. Further, the first rod-shaped portions 51 in the first rod-shaped unit 50 and the second rod-shaped portions 53 in the second rod-shaped unit 52 extend in mutually opposite directions. This makes it possible to further facilitate shortening of the length of the rod-shaped portions while arranging the rod-shaped portions throughout the second chamber 30. Accordingly, occurrence of a warpage in the rod-shaped portion can be further inhibited when carrying out injection molding for the resin member 5.

9. Other Embodiments (1) The resin member 5 of the above-described embodiments comprise the first and second rod-shaped units 50 and 52, but may be configured with the first rod-shaped unit 50 alone. In other words, the first rod-shaped portions 51 may be provided on the first portion 54A alone of the coupling member 54. The length of the first rod-shaped portions 51 may be adjusted, and the resin member 5 may be arranged in the chamber such that the coupling member 54 and the tips of the first rod-shaped portions 51 are positioned on, or in the vicinity of, the inner wall of the second chamber 30. Alternatively, two or more rod-shaped units may be provided on the first portion 54A and/or the second portion 54B of the resin member 5 of the above-described embodiments, to thereby provide the resin member 5 with three or more rod-shaped units.

(2) Two or more functions of a single element in the above-described embodiments may be performed by two or more elements, and a single function of a single element may be performed by two or more elements. Two or more functions performed by two or more elements may be performed by a single element, and a single function performed by two or more elements may be performed by a single element. Part of the configuration in the above-described embodiments may be omitted. At least a part of the configuration in the above-described embodiments may be added to or replace another configuration in the above-described embodiments.

What is claimed is:

1. A canister configured to be mounted in a vehicle with an engine, the canister comprising:

at least one chamber in which an adsorbent to adsorb fuel vapor is arranged;

an inflow port configured to allow the fuel vapor to flow into the at least one chamber from a fuel tank of the vehicle;

an atmosphere port configured to allow atmospheric air to flow into the at least one chamber from outside of the vehicle;

an outflow port configured to allow the fuel vapor adsorbed on the adsorbent to flow out toward the engine by means of the atmospheric air flowing in from the atmosphere port; and a resin member arranged in an object chamber, the object chamber being any of the at least one chamber, the adsorbent arranged in the object chamber being formed as a plurality of granular bodies, the resin member being an integrally formed member of resin, the resin member comprising a coupling member and at least one rod-shaped unit, the at least one rod-shaped unit comprising a plurality of rod-shaped portions extending from the coupling member in an extending direction substantially parallel to a direction intersecting a gas flow direction in the object chamber at an angle in a range of from 45° to 90°; and at least a part of the plurality of rod-shaped portions having, on an outer peripheral surface thereof, at least one recess formed therein.

2. The canister according to claim 1, wherein the object chamber has an elongated shape extending in the gas flow direction in the object chamber.

3. The canister according to claim 1, wherein the resin member comprises, as the at least one rod-shaped unit, a first rod-shaped unit and a second rod-shaped unit, wherein the coupling member comprises a first portion and a second portion, the second portion being positioned on a side opposite to the first portion, wherein the plurality of rod-shaped portions in the first rod-shaped unit extends, from the first portion, substantially parallel to a direction determined according to the first rod-shaped unit, and wherein the plurality of rod-shaped portions in the second rod-shaped unit extends, from the second portion, substantially parallel to a direction determined according to the second rod-shaped unit.

4. The canister according to claim 3, wherein the first rod-shaped unit and the second rod-shaped unit have a substantially identical shape.

5. The canister according to claim 4, wherein the resin member has a substantially plane-symmetrical shape with respect to a plane passing through the coupling member.

6. The canister according to claim 1, wherein the extending direction of the plurality of rod-shaped portions is a direction intersecting the gas flow direction in the object chamber at an angle of approximately 90°.

7. The canister according to claim 1, wherein both ends of the resin member in the gas flow direction are positioned near an inner wall of the object chamber.

8. The canister according to claim 1, wherein the coupling member extends in the gas flow direction.

9. A canister configured to be mounted in a vehicle with an engine, the canister comprising:

at least one chamber in which an adsorbent to adsorb fuel vapor is arranged;

an inflow port configured to allow the fuel vapor to flow into the at least one chamber from a fuel tank of the vehicle;

an atmosphere port configured to allow atmospheric air to flow into the at least one chamber from outside of the vehicle;

an outflow port configured to allow the fuel vapor adsorbed on the adsorbent to flow out toward the engine by means of the atmospheric air flowing in from the atmosphere port; and a resin member arranged in an object chamber, the object chamber being any of the at least one chamber, the adsorbent arranged in the object chamber being formed as a plurality of granular bodies, the resin member being an integrally formed member of resin, the resin member comprising a coupling member and at least one rod-shaped unit, the at least one rod-shaped unit comprising a plurality of rod-shaped portions extending from the coupling member in an extending direction substantially parallel to a direction intersecting a gas flow direction in the object chamber at an angle in a range of from 45° to 90°, the resin member comprising, as the at least one rod-shaped unit, a first rod-shaped unit and a second rod-shaped unit, the coupling member comprising a first portion and a second portion, the second portion being positioned on a side opposite to the first portion, the plurality of rod-shaped portions in the first rod-shaped unit extending, from the first portion, substantially parallel to a direction determined according to the first rod-shaped unit, and the plurality of rod-shaped portions in the second rod-shaped unit extending, from the second portion, substantially parallel to a direction determined according to the second rod-shaped unit.

10. The canister according to claim 9, wherein the object chamber has an elongated shape extending in the gas flow direction in the object chamber.

11. The canister according to claim 9, wherein the first rod-shaped unit and the second rod-shaped unit have a substantially identical shape.

12. The canister according to claim 11, wherein the resin member has a substantially plane-symmetrical shape with respect to a plane passing through the coupling member.

13. The canister according to claim 9, wherein the extending direction of the plurality of rod-shaped portions is a direction intersecting the gas flow direction in the object chamber at an angle of approximately 90°.

14. The canister according to claim 9, wherein both ends of the resin member in the gas flow direction are positioned near an inner wall of the object chamber.

15. The canister according to claim 9, wherein the coupling member extends in the gas flow direction.

* * * * *